(12) United States Patent
Faughn et al.

(10) Patent No.: US 9,840,226 B2
(45) Date of Patent: Dec. 12, 2017

(54) LIGHTED EGRESS APPARATUS

(71) Applicants: Jim Allen Faughn, Baltimore, MD (US); Richard William Kozycki, Street, MD (US)

(72) Inventors: Jim Allen Faughn, Baltimore, MD (US); Richard William Kozycki, Street, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 422 days.

(21) Appl. No.: 13/916,745

(22) Filed: Jun. 13, 2013

(65) Prior Publication Data

US 2013/0335951 A1 Dec. 19, 2013

Related U.S. Application Data

(60) Provisional application No. 61/659,214, filed on Jun. 13, 2012.

(51) Int. Cl.
*B60R 22/32* (2006.01)
*B60R 22/12* (2006.01)
*B60Q 3/242* (2017.01)

(52) U.S. Cl.
CPC .............. *B60R 22/12* (2013.01); *B60Q 3/242* (2017.02)

(58) Field of Classification Search
CPC ..... B60R 22/12; F21V 25/00; F21V 33/0064; F21V 33/008; F21V 33/0084; B62B 11/008; B62B 29/00; B62D 2250/271

USPC .............. 362/119; 224/232, 162; 7/158, 170
See application file for complete search history.

(56) References Cited

U.S. PATENT DOCUMENTS

| | | | |
|---|---|---|---|
| 5,472,235 A * | 12/1995 | Dubay | B60R 22/12 280/801.1 |
| 5,900,734 A * | 5/1999 | Munson | 324/433 |
| 7,434,316 B2 * | 10/2008 | Nenadic | 30/143 |
| 7,566,984 B2 * | 7/2009 | Blanchard | 307/9.1 |
| 2003/0142490 A1 * | 7/2003 | Parsons | A44B 15/005 362/200 |
| 2006/0087826 A1 * | 4/2006 | Anderson | B60K 35/00 362/23.01 |
| 2006/0274542 A1 * | 12/2006 | Goulet et al. | 362/490 |
| 2007/0195990 A1 * | 8/2007 | Levy | B60R 22/48 382/100 |
| 2008/0271257 A1 * | 11/2008 | Frazer | 7/158 |

(Continued)

*Primary Examiner* — Elmito Breval
*Assistant Examiner* — Naomi M Wolford
(74) *Attorney, Agent, or Firm* — Christos S. Kyriakou

(57) ABSTRACT

A lighted egress apparatus includes a unitary body comprising a cavity therewithin, the cavity comprising a power supply supplying electricity and circuitry coupled to the power supply and conducting the electricity; a fixed blade partially fixed within the cavity and comprising a cutting blade, wherein the cutting blade is exposed from the unitary body and positioned at a constant cutting angle; a switch partially fixed within the cavity and coupled to the circuitry, wherein activation of the switch completes the circuitry and allows the circuitry to conduct the electricity; and an illumination device partially fixed within the cavity and coupled to the circuitry, wherein the illumination device illuminates as the circuitry conducts the electricity to the illumination device and positioned to direct illumination in front of the cutting blade.

21 Claims, 11 Drawing Sheets

(56) References Cited

U.S. PATENT DOCUMENTS

2009/0265858 A1* 10/2009 White .................... A62B 3/005
                                                        7/158
2010/0317247 A1* 12/2010 McGlynn ........................ 441/80
2011/0291849 A1* 12/2011 Helms et al. ................. 340/669

* cited by examiner

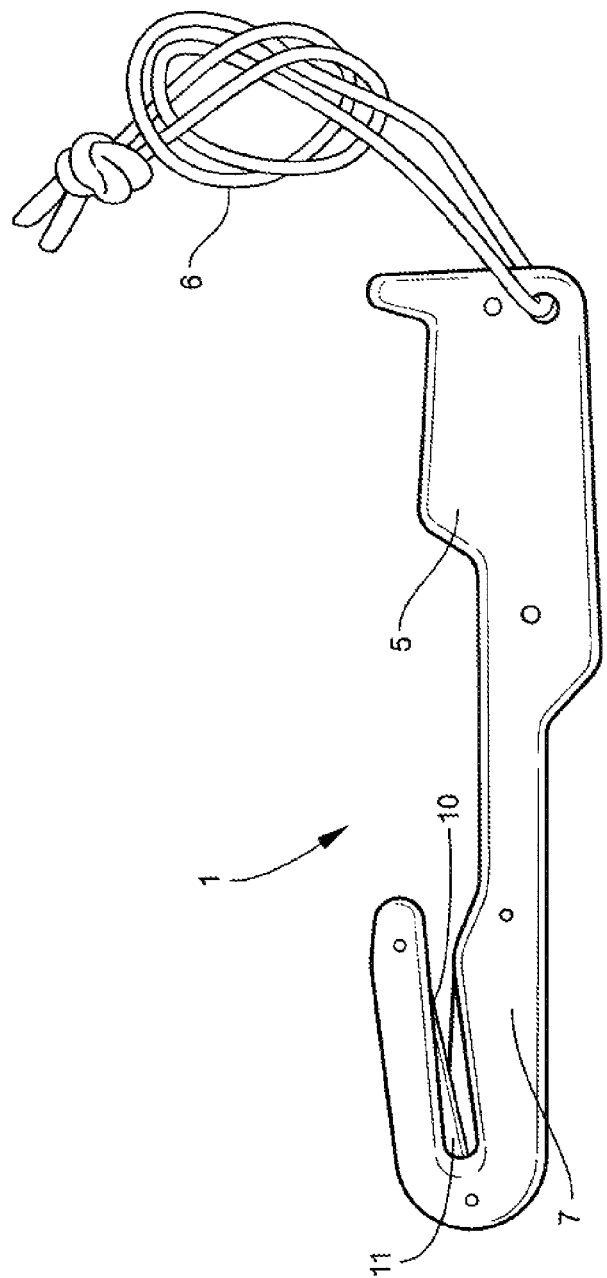

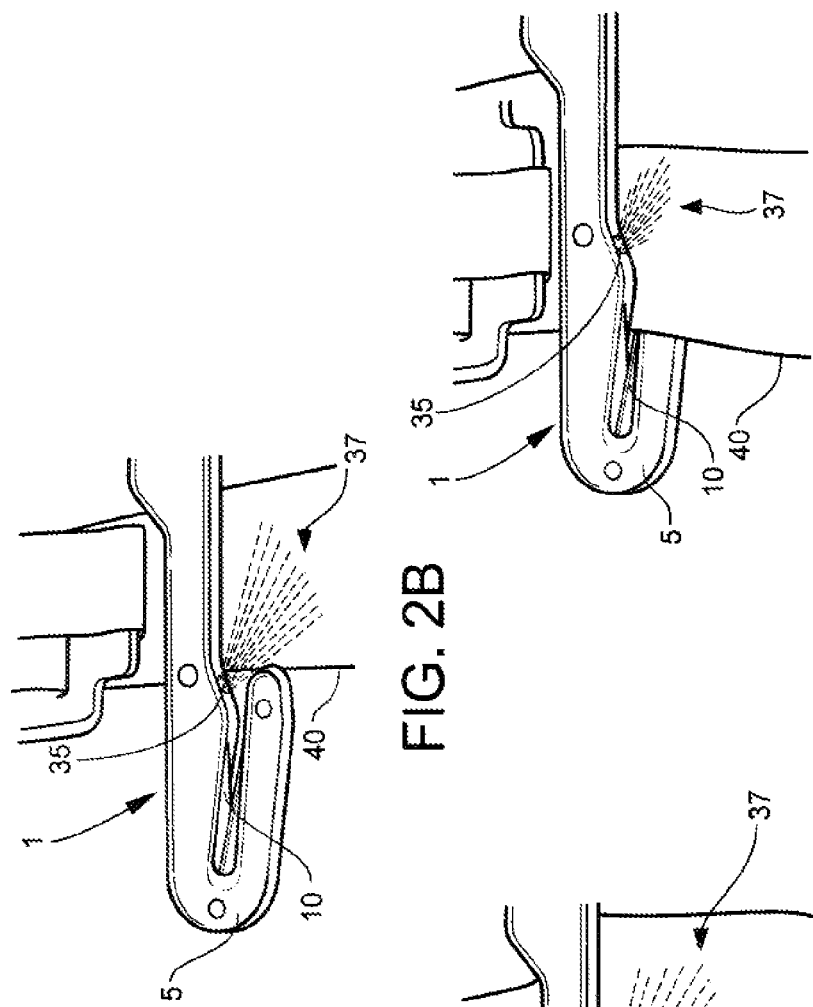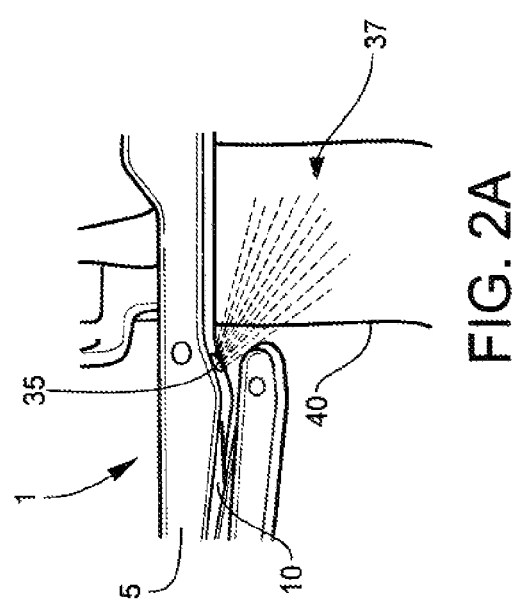

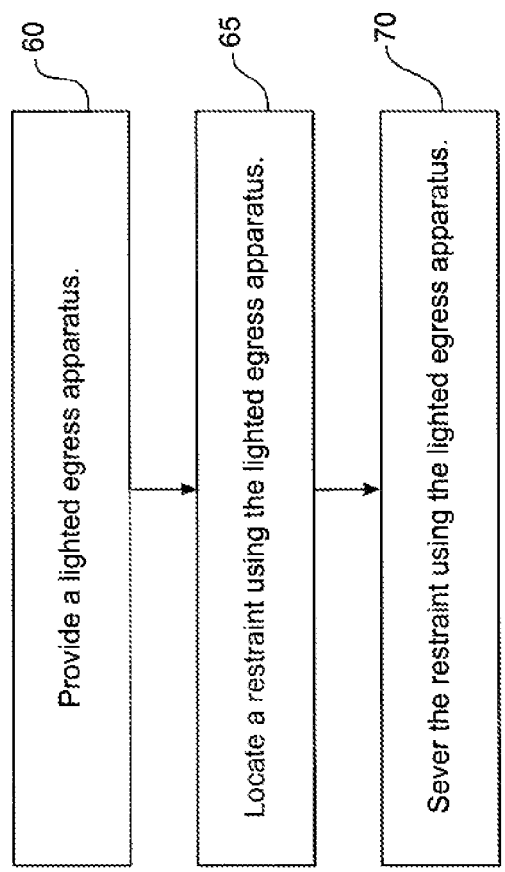

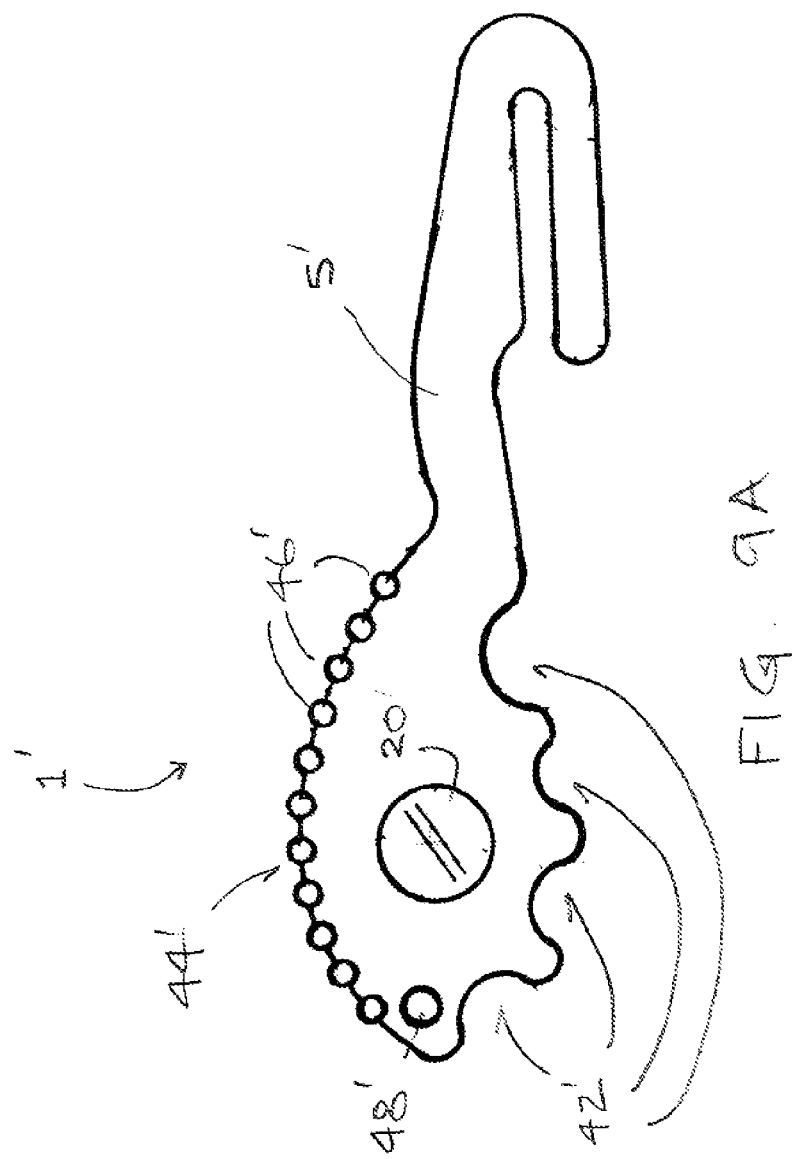

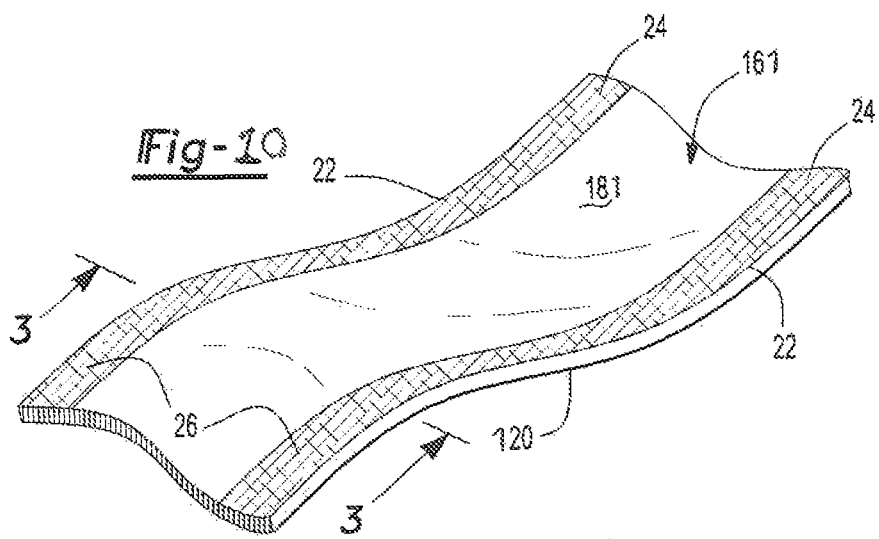
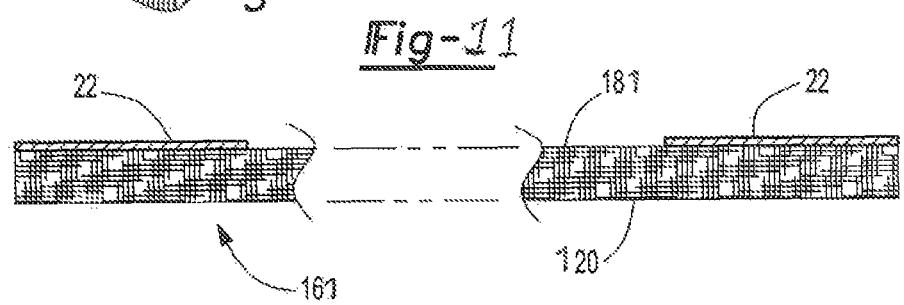
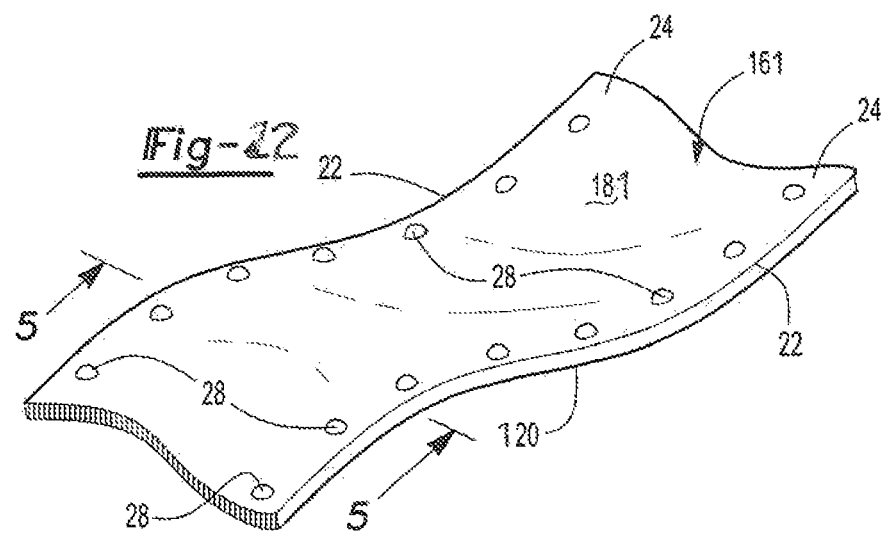
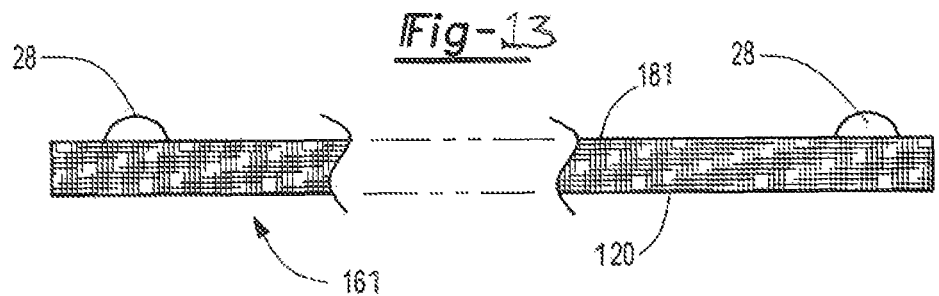

LIGHTED EGRESS APPARATUS

CROSS REFERENCE TO RELATED APPLICATIONS

This patent application claims the benefit of U.S. Provisional Patent Application No. 61/659,214 titled "Lighted Egress Apparatus" filed on Jun. 13, 2012; the entire contents which are hereby incorporated by reference herein including all attachments and other documents that were incorporated by reference in U.S. Provisional Patent Application No. 61/659,214. This patent application is related to U.S. Non-Provisional patent application Ser. No. 13/916,725 titled "Personnel Restraint Seat Belt" and filed on Jun. 13, 2013 the contents of which are hereby incorporated by reference herein.

GOVERNMENT INTEREST

The embodiments herein may be manufactured, used, and/or licensed by or for the United States Government without the payment of royalties thereon.

BACKGROUND OF THE INVENTION

Technical Field

The embodiments herein generally relate to an egress apparatus, more particularly, to a lighted egress apparatus and in certain desirable embodiments to a lighted egress apparatus that works in conjunction with reflective surfaces or other visual indicators that are provides on seat belts.

Description of the Related Art

The use of seat belts in a number of vehicles has greatly enhanced the safety of individuals in the operation of such vehicles. Unfortunately, during certain emergency situations, distressed individuals contained within an associated vehicle are required to affect rapid escape due to such conditions that may exist, such as fire, flooding, gas tank explosion and the like. Frequently, in such emergency situations, external light is not available and/or the distressed individuals may not have full use of all limbs.

In conventional systems, safety/rescue knives have several features, which distinguish them from other types of knives, but are typically used by persons other than the distressed individual. Thus, components found in a conventional safety/rescue knife stem from the need to use such safety/rescue knives for the purpose of extricating someone who is unwillingly being restrained or otherwise confined. Accordingly, safety/rescue knives are generally used to cut straps, lines, or sheets of material that may prevent movement by a person who, for whatever reason, is unable to do so on their own.

BRIEF SUMMARY OF THE INVENTION

In view of the foregoing, an embodiment herein provides an apparatus comprising a unitary body comprising a cavity therewithin, the cavity comprising a power supply supplying electricity and circuitry coupled to the power supply and conducting the electricity; a fixed blade partially fixed within the cavity and comprising a cutting blade, wherein the cutting blade is exposed from the unitary body and positioned at a constant cutting angle; a switch partially fixed within the cavity and coupled to the circuitry, wherein activation of the switch completes the circuitry and allows the circuitry to conduct the electricity; and an illumination device partially fixed within the cavity and coupled to the circuitry, wherein the illumination device illuminates as the circuitry conducts the electricity to the illumination device and positioned to direct illumination in front of the cutting blade.

In such an apparatus, the unitary body may comprise at least one of a waterproof, shockproof, and vibration-proof housing. In addition, the power supply may comprise at least one of a battery and a capacitor. Furthermore there may be several options of cutting blade(s) employed in an apparatus of the present invention, for example, the fixed blade may be a single blade or other cutting surface or may comprise twin-cutting blades arranged in a "V" configuration or may be fashioned from the body of the knife itself by having a ground knife edge at the vertex of two legs. For brevity, this invention will discuss only one such option but does not limit the scope of many different cutting blade configurations and options which can be used in the knife. Moreover, the unitary body may comprise a housing comprising a top wall, a first side wall spaced from and parallel to a second side wall, a rear end wall, and a forward end wall, wherein the cavity may comprise a "V" shaped cavity defining an upper planar jaw wall and a lower planar jaw wall, the upper and lower planar jaw walls arranged orthogonally relative to the first and second side walls and defining an acute angle between the upper planar jaw wall and the lower planar jaw wall, and wherein the twin-cutting blades may be orthogonally and fixedly mounted to the lower planar jaw wall.

Additionally, in such an apparatus, the circuitry may comprise at least one of wires, conductive ribbons, thin film circuitry, and printed circuits. Moreover, the switch may comprise at least one of a mechanical switch, an electromechanical switch, and a magnetic switch. In addition, the illumination device may comprise at least one of a fiber optic light source, a light emitting diode (LED), an incandescent light source, and an electroluminescent light source. The illumination device may emit light in other than wavelengths normally visible to humans for example, Ultra Violet (UV), Infra-Red (IR), and other non-visible wavelengths. Furthermore, the illumination device may deliver at least one of constant illumination and intermittent illumination. Additionally, the illumination device may comprise a multi-color LED and the illumination device illuminates in a first color when delivering constant illumination and the illumination device illuminates in a second color when delivering intermittent illumination.

Another embodiment herein provides a system comprising a lighted egress apparatus comprising: a unitary body comprising a cavity therewithin, the cavity comprising a power supply supplying electricity and circuitry coupled to the power supply and conducting the electricity; a fixed blade partially fixed within the cavity and comprising a cutting blade, wherein the cutting blade is exposed from the unitary body and positioned at a constant cutting angle; a switch partially fixed within the cavity and coupled to the circuitry, wherein activation of the switch completes the circuitry and allows the circuitry to conduct the electricity; and an illumination device partially fixed within the cavity and coupled to the circuitry, wherein the illumination device illuminates as the circuitry conducts the electricity to the illumination device and positioned to direct illumination in front of the cutting blade; and a stowage device securely stowing the lighted egress apparatus.

In such a system, the stowage device may comprise a long-term restraint and a temporary restraint, wherein the temporary restraint is accessible only after the long-term restraint has been released. Moreover, the temporary restraint may comprise at least one of a hook and loop restraint, a spring mechanism, and a magnetic release. In addition, the long-term restraint may comprise a handle and tab, and activation of the handle and tab may release the lighted egress apparatus from the long-term restraint. Furthermore, the long-term restraint may comprise a long-term restraint illumination device and the long-term restraint illumination device receives power from at least one of an internal power supply and an external power supply.

Such a system may further comprise a sensor sensing at least one of a crash and a rollover of a vehicle, wherein upon the sensor sensing at least one of a crash and a rollover, the long-term restraint illumination device illuminates the long-term restraint. In addition, each of stowage device and the lighted egress apparatus may comprise a power coupling, and wherein the lighted egress apparatus receives power from the stowage device through the power coupling. Moreover, the stowage device may comprise an audio device, the power coupling may detect a power level of the power supply of the lighted egress apparatus, and the audio device may emit an audio signal when the power level of the power supply is detected below a safety power threshold. Additionally, such a system may further comprise a long-term restraint illumination device that illuminates the long-term restraint when the power level of the power supply is detected below a safety power threshold.

Another embodiment herein provides an apparatus comprising a unitary body, comprising: a first cavity therewithin, the first cavity comprising a power supply supplying electricity and circuitry coupled to the power supply and transporting the electricity; a main body; a lower jaw fixedly coupled to the main body; and a second cavity formed from the main body and the lower jaw; a twin-cutting blade fixed within the second cavity and comprising a first cutting blade partially fixed within the first cavity and a second cutting blade fixed to the lower jaw, wherein the twin-cutting blade is partially exposed from the unitary body and positioned at a constant cutting angle; a switch partially fixed within the first cavity and coupled to the circuitry, wherein activation of the switch completes the circuitry and allows the circuitry to convey the electricity; and an illumination device partially fixed within the first cavity and coupled to the circuitry, wherein the illumination device illuminates as the circuitry conveys the electricity to the illumination device and positioned to direct illumination in front of the twin-cutting blade.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE SEVERAL VIEWS OF THE DRAWINGS

The embodiments herein will be better understood from the following detailed description with reference to the drawings, in which:

FIG. 1 illustrates a schematic diagram of a lighted egress apparatus according to an embodiment herein;

FIG. 2A illustrates a schematic diagram of a lighted egress apparatus in use according to an embodiment herein;

FIG. 2B illustrates another schematic diagram of a lighted egress apparatus in use according to an embodiment herein;

FIG. 2C illustrates yet another schematic diagram of a lighted egress apparatus in use according to an embodiment herein;

FIG. 8 illustrates a flow diagram of a preferred method according to an embodiment herein;

FIG. 9A illustrates a schematic diagram of another lighted egress apparatus according to another embodiment herein;

FIG. 10 is a plan view of a section of a seat belt web;

FIG. 11 is a view taken along line 3-3 in FIG. 10;

FIG. 12 is a view similar to FIG., but illustrating a modification thereof, and

FIG. 13 is a view taken along lines 5-5 in FIG. 14.

DETAILED DESCRIPTION OF THE INVENTION

Figures 3A, 3B:
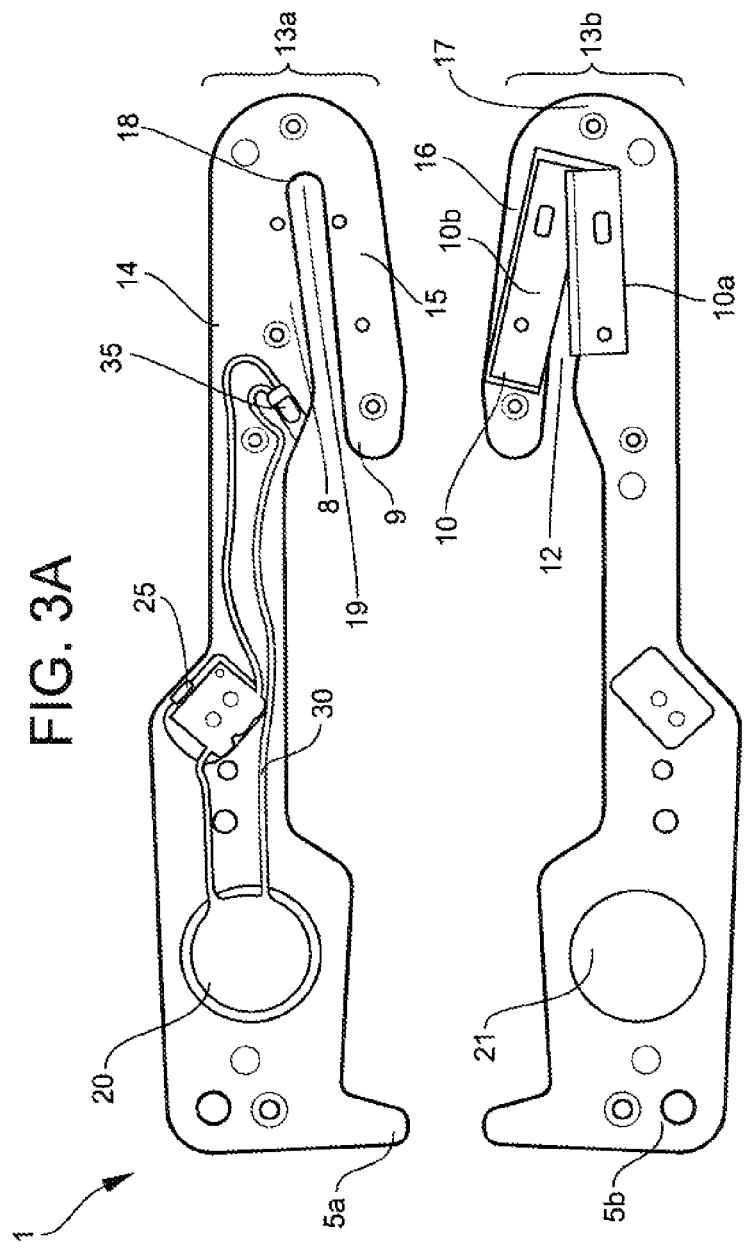
FIG. 3A illustrates an internal schematic diagram of a lighted egress apparatus according to an embodiment herein.
FIG. 3B illustrates another internal schematic diagram of a lighted egress apparatus according to an embodiment herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein provide a lighted egress apparatus. Such a lighted egress apparatus provides life-saving assistance in an emergency situation by allowing a distressed individual to free themselves from restraints without assistance from another person and without additional light. Referring now to the drawings, and more particularly to FIGS. 1 through 9B, where similar reference characters denote corresponding features consistently throughout the figures, there are shown preferred embodiments.

As shown in FIGS. 1 through 6 and 9A and 9B, lighted egress apparatus 1 includes a unitary body 5 (comprising first body component 5a and second body component 5b) that houses cutting blades 10 (which includes fixed blades 11, first cutting blade 10a and second cutting blade 10b), power supply 20, switch 25, circuitry 30, and illumination device 35. As shown in FIG. 1, lighted egress apparatus 1 includes a main body 7 (that holds cutting blades 10, as described below) and an optional lanyard 6. Also shown in FIG. 1, unitary body 5 is configured for improved one handed gripping and includes a pair of recessed cutting blades 10 (within main body 7) in a "V" configuration to entrap a belt (e.g., strap 40, shown in FIG. 2A through 2C) and sever them as the cutting blades 10 are pulled through a seat belt strap 40 or other restraint. In addition, cutting blades 10 are recessed and are protected in body 5 of lighted egress apparatus 1 to prevent fingers, hands, or other body parts from accidentally coming into contact with cutting blades 10 and causing a cut or injury. This feature is advantageous during highly stressed emergency extractions when speed of operation is of life and death importance. Having the capability to cut through restraint straps allows people an alternative approach of release in the event of a malfunctioning or difficult to reach seat belt release buckle. As shown in FIGS. 2A through 2C, with reference to FIG. 1, cutting blades 10 are configured in body 5 of lighted egress apparatus 1 so the strap or webbing to be cut (e.g., strap 40) is positioned and easily fed into cutting blades 10 when lighted egress apparatus 1 is pulled across strap 40. The illumination device 35 provides illumination 37 onto the area of the strap 40 that is going to be cut. In certain desirable embodiments, light is specifically directed in front of the cutting surface so that the blade(s) can be directed to a belt, restraint or other surface that is to be cut.

Further detail of an exemplary lighted egress apparatus 1, according to one embodiment herein, is shown in FIGS. 3A and 3B, with reference to FIGS. 1 through 2C. As shown, lighted egress apparatus 1 includes a two-piece housing 13a, 13b that further includes a top wall 14, a first side wall 15 spaced from and parallel to a second side wall 16, a rear end wall 17, and a forward end wall 18. In addition, FIGS. 3A and 3B illustrate a first cavity 21 (that secures power supply 20, switch 25 and circuitry 30 within first body component 5a) and a "V" cavity 12 (or a second cavity) that is defined by an upper planar jaw wall 8 and a lower planar jaw wall 9. In addition, in such an embodiment, upper planar jaw wall 8 and lower planar jaw wall 9 are arranged orthogonally relative to first sidewall 15 and second sidewall 16 and define an acute angle 19 between the upper planar jaw wall 8 and the lower planar jaw wall 9. Moreover, in at least one embodiment, cutting blades 10 are orthogonally and fixedly mounted to upper planar jaw wall 8 and lower planar jaw wall 9. In such an embodiment, lighted egress apparatus 1 is configured as a handheld knife designed to cut restraint straps and webbing during emergency egress situations (e.g., as shown in FIGS. 2A through 2C). Alternatively, a singular cutting surface or sharpened edge may be provided for cutting the seat belt strap 40.

As discussed in further detail below, the ability of lighted egress apparatus 1 to have its own light source may prove to be the difference between life and death during emergency situations when personnel trapped inside of a vehicle need to be extracted rapidly. The light is emitted directly over the area where cutting blades 10 would engage the restraining straps (e.g., strap 40 shown in FIGS. 2A through 2C), so the user can readily see what and where to cut. In addition, personnel combative individuals are often wearing combat equipment that includes, but is not limited to, body armor, an ammunition load vest with ammunition pouches and grenades, hydration pack, bayonet, flashlight, radios and communication gear, medical supplies, and any other gear or equipment that may be required for a mission. With all of this gear encumbering the trapped individual (e.g., a soldier, a warfighter, etc.), combined with the chaos and disorientation resulting from a crash and/or rollover, the apparatus described herein allow a trapped individual to more easily locate, identify, and cut through the appropriate restraint belt without accidently cutting or severing other essential components, in low light conditions and even in complete darkness.

In addition, lighted egress apparatus 1 can be used to establish situational awareness (SA) inside a vehicle (not shown). With the added light feature, illumination can be provided (e.g., via illumination device 35 shown in FIG. 6) to see other personnel in a disabled vehicle (not shown) and ascertain injuries, assess damage, determine SA, and identify immediate issues critical for vehicle egress and extraction. In at least one embodiment, the apparatus 1 is waterproof to allow emergency egress in any situation where water/liquid immersion would be a factor.

In addition, while a specific configuration of cutting blades 10 is shown in FIGS. 1 through 6, the embodiments herein enable any knife, cutting device, hand tool, etc. to be modified to accept the other components which then provide the additional light feature as described with respect to lighted egress apparatus 1. Thus, lighted egress apparatus 1 is just one example of a survival instrument that can benefit from the embodiments herein described. The embodiments herein can also be configured as a modification to any number of escape knives, emergency egress tools, survival items, or other common tools known to those skilled in the art to operate such tools in low light or dark conditions. In addition, while not shown the accompanying figures, the embodiments herein include components such as a system package (e.g., lighted egress apparatus 1 and stowage device 52—shown in FIG. 7), that can be incorporated into or onto any desired tool, knife, or device such that the system package may also be an easy add-on retrofit to currently existing equipment. The basic intent and function of this invention can be incorporated into many different configurations which would adapt to existing tools, knives, etc. simply by reconfiguring the variable mounting apparatus which houses the invention. This allows the invention to be retrofitted to all currently fielded rescue knives, tools, etc. already in use with low cost adaptor mounting plates or devices. These modified mounts can be universal in design or tailored to fit only one specific item, they can be designed as a simple bolt-on user applied device to their existing item.

As shown in FIG. 3A, power supply 20 can be any type of battery or self-contained power source (e.g., a capacitor or a battery), which supplies power to operate illumination device 35. In addition, power supply 20 can be incorporated into the interior of body 5 or tool or could be located on the exterior of body 5 as well or as a retrofit to an existing egress system or tool (not shown). Power supply 20 preferably has a long shelf life to ensure functionality over a long span of time. In addition, power supply 20 can be configured as any type of battery, cell, etc. which would provide the required energy for lighted egress apparatus 1 to operate. In certain embodiments the power supply is replaceable so that field replacement would be easy and quick. Thus in certain embodiments, a power supply access door, panel, slot, cover, or other means for accessing a power supply compartment is provided. Desirably, to the means for accessing a power supply, e.g. a battery compartment, would allow easy opening and closing for access without using special tools and would allow access using a common item such as a coin, a bullet tip, a pencil point a pen point and so forth. Desirably, the access door should be waterproof. For applications where lighted egress apparatus 1 would be used during emergency situations, desirably the apparatus 1 could also have a "low power" indicator (described below) to ensure lighted egress apparatus 1 has sufficient power to operate effectively. Other applications not considered as "survival items" would most likely not have to incorporate a low power indicator, but could if desired. Additional embodiments of power supply 20 may include at least one of the following: an internal generating power source (e.g., a self winding generator), rechargeable power supply 20 that is recharged by a stowage unit (as described below), solar cells, replaceable power supply, another external power supply, or any other means which would develop enough power to illuminate illumination device 35.

Figure 4:
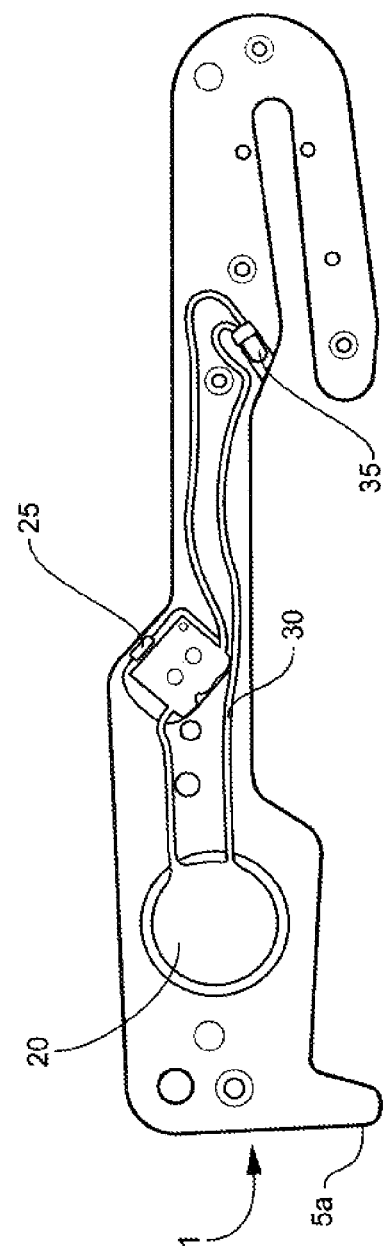
FIG. 4 illustrates yet another internal schematic diagram of a lighted egress apparatus according to an embodiment herein.

In one embodiment, shown in FIG. 4, circuitry 30 connects to power supply 20. Circuitry 30, for example, connects to switch 25 and illumination device 35 to form a functioning circuit. Embodiments of circuitry 30 include wires, conductive ribbons, printed circuits, conductive thin film, or any other means that can transfer power to the other components. In addition, embodiments of circuitry 30 may include the circuitry 30 being built into the interior of apparatus 1 or attached to an exterior of any device as a retrofit if properly shielded, protected, integrated, and attached. Additional embodiments of the circuitry 30 take advantage of other technologies to optimize the features such as current limiting resistors, other switching devices, or advanced power supplies for example.

Figure 5:
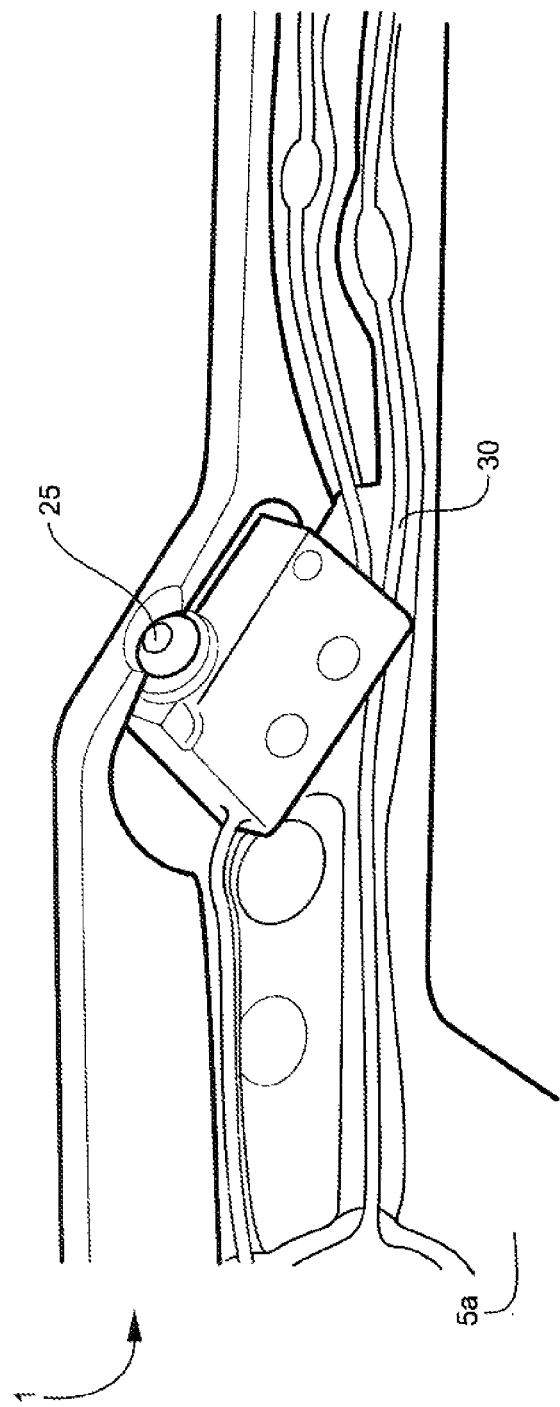
FIG. 5 illustrates an enlarged schematic diagram of a switch apparatus according to an embodiment herein.

As shown in FIG. 5, one embodiment of switch 25 is a manually activated device that allows circuitry 30 to be in either an open or closed mode. In one embodiment, circuitry 30 would normally be in an open mode or "OFF" position when not in use. When switch 25 is depressed or activated to the "ON" position, switch 25 closes and completes the circuitry 30 to thereby deliver electrical energy to illumination device 35 (e.g., shown in FIG. 6). In addition, switch 25 can be any device or method that will open and close a circuit (e.g., circuitry 30). For example, embodiments of switch 25 include, but are not limited to a micro-switch, reed switch, physical contacts, magnetic type, or any other switching means know to those skilled in the art. In addition, embodiments of switch 25 allow a momentary circuit closed or "ON" position when lighted egress apparatus 1 is actuated by a user. In one embodiment of lighted egress apparatus 1, switch 25 is located in an anthropometrically and ergonomically friendly position that would allow a user to operate lighted egress apparatus 1 easily with one hand, finger or thumb, gripping motion, etc. and still be protected against inadvertent operation. Moreover, an embodiment of switch 25 is waterproof, explosion proof, sealed, non-sparking, etc. depending upon the environment, situations, and conditions in which lighted egress apparatus 1 is required to operate.

Figure 6:
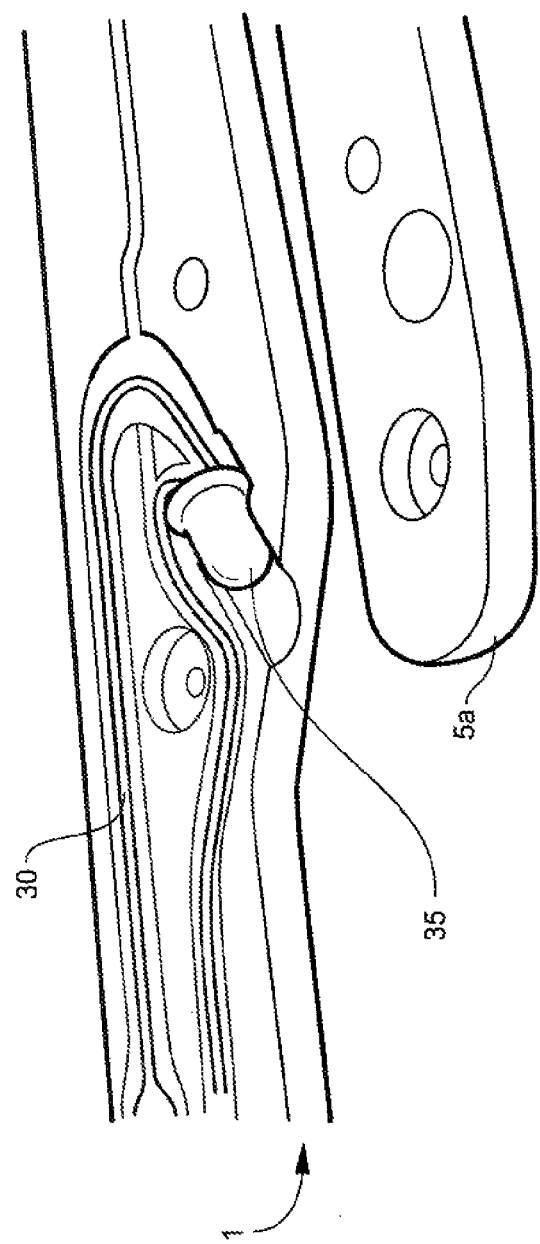
FIG. 6 illustrates an enlarged schematic diagram of an illumination apparatus according to an embodiment herein.

FIG. 6, with reference to FIGS. 1 through 5, illustrates illumination device 35, which provides light when power is applied to the illumination device 35. As shown in FIG. 6, the illumination of illumination device 35 is directed towards the opening of cutting blades 10 and onto a strap 40 (shown in FIGS. 2A through 2C), thus, illuminating the area that the user observes when feeding strap (e.g., strap 40 shown in FIGS. 2A through 2C), webbing or other material to be severed into the cutting area of lighted egress apparatus 1. Once the item to be cut is located and identified with lighted egress apparatus 1, the item (e.g., strap 40) is then fed into cutting blades 10 of lighted egress apparatus 1 and severed (e.g., as shown in FIGS. 2A through 2C). Embodiments of illumination device 35 include any number of items that will illuminate when supplied with electrical energy (e.g., LED, incandescent, electroluminescent, etc.). In addition, the illumination provided by illumination device 35 may be of any color or a specific emitted wavelength or band or range of wavelengths required for any special operations.

In certain desirable embodiments, a lighted egress apparatus 1 may include and primary light source 35 or a secondary light source that emits electromagnetic radiation at a wavelength that is reflected by certain features that are provided on a safety belt. For example, in consideration of warfighter safety when there may be instances where reducing or eliminating any visual illumination signatures produced by the lighted egress apparatus (for example, during a covert or secretive mission where light discipline is important or critical). Thus, in certain desirable embodiments, the lighted apparatus can emit light in non-visual wavelengths or low visibility wavelengths. When used in this mode items to be illuminated (seat restraints, escape hatches, exit doors, emergency egress pathways, hatch handles, etc.) should include the use of special materials only illuminated by these unique wavelengths and not by normal illumination devices. Examples of seat restraints that include such specific materials and configurations of reflective materials are described and illustrated in the attached document titled "Improved safety restrain belts for faster secondary emergency egress and validation of correct wear in covert and non-covert conditions using visual and tactile indicators, (Visi-Tac Belt)" which is hereby incorporated by reference herein. The use of an apparatus 1 with a light source 35 that emits light that would be difficult to detect at a distance but that would still allow a warfighter the ability to use the apparatus while maintaining total light discipline to rapidly locate critical emergency egress items, maintain their night vision dark adaptation, and be totally blind to the enemy or others in the nearby area when using the apparatus. The apparatus could be outfitted with both visible and non-visible wavelength illuminators so any covert or non-covert situation could be accomplished just by switching to the different illumination modes.

Use of fluorescent or phosphorescent invisible paints, inks, dyes, markers, powders and so forth can be used as the identifying agent on critical escape items to take advantage of the non-visible wavelengths emitted from the apparatus, instead of the normal visual wavelengths. An advantage of these materials is that they appear invisible under ordinary lighting yet fluoresce brilliantly under Ultra Violet (UV) light commonly referred to as "Blacklight". These materials can be tailored to fluoresce at different wavelengths if special covert requirements dictate this for even greater security so that even a normal wavelength blacklight would not cause the substance to fluoresce. These ultra high visibility UV fluorescing materials are available in many colors to provide a wide range of colors for signaling and information cueing if required. In certain embodiments the lighted egress apparatus 1 may include one or more tritium dots or another luminous material or luminous paint at or near the rear end wall 17 and/or forward end wall 18 that can be used to provide markings that are visible under specific lighting to indicate the cutting end of the lighted egress apparatus 1. Thus, tritium dots or other luminescent material can be used to provide a visual indicator of the cutting end of the lighted egress apparatus 1 and further facilitate use of the apparatus in an emergency situation. In still other embodiments the lighted egress apparatus 1 may include high visibility, reflective, luminous or other attention getting devices, paints, coverings, coatings or the like to draw attention to the cutting end and/or cutting area of the lighted egress apparatus 1. Thus, a user of the device will be assisted in more quickly ascertaining the cutting end of the device so that the user can use the device more quickly and easily in lighted and low light conditions.

Typical effective range for the UV LED is around a one-foot to about three-foot radius so this would be effective for personal extraction efforts by the same warfighter and an additional buddy (or passenger) seated next to him or her. This short effective illumination range will exclude any enemy attempts to illuminate the restraint belts from any distance greater than one foot (with a blacklight), so the safety of the warfighter will be maintained; however, the limited distance may also be less effective for friendly rescue and extraction crews in their efforts to locate, identify, and sever targeted restraint belts from distances beyond one foot. However, most rescue/extraction crews would be equipped with normal flashlights and illumination devices for rescue searches/extractions and not be concerned with covert rescues. Other materials and different illumination devices may be able to maintain the selective wavelength illumination advantages yet allow for a slightly greater illumination distance of several feet—still well within any safety boundary for protection against enemy identification or targeting yet allows a better opportunity of rapid egress for the crews and rescue teams.

LED bulbs used to excite these materials can be manufactured in different wavelengths (for example from about 240 nm to about 355 nm) which can correspond to the same specific wavelength of the fluorescent material—in this manner both the illumination device and fluorescent material would need to have a matched wavelength in order to function (illuminate). This will effectively eliminate the possibility of an enemy being able to excite the exact reflective/fluorescent materials even with any normal blacklight (non matching wavelength).

Blacklight or UV light will cause fluorescent or phosphorescent pigments to fluoresce, which in turn emits visible light which humans can perceive. Another advantage of blacklight is that it will not affect or alter a warfighters "night vision," once a warfighter has "dark adapted" the use of UV lighting will not hinder or affect their visual status. This may be a very advantageous attribute in certain situations of covert military operations. Humans typically only view the visible spectrum from 400 nm to 700 nm; however there are additional invisible colors which exist above and below these thresholds. UV light will cause phosphorescent or fluorescent pigments to fluoresce, which will in turn cause the pigments to emit visible light to the human eye.

Below is a table of colors visible and not visible to the human eye.

| Color | Wavelength Interval | Visible to the Human Eye |
| --- | --- | --- |
| Infra-Red | above 700 nm | No |
| Red | 635-700 nm | Yes |
| Orange | 590-635 nm | Yes |
| Yellow | 560-590 nm | Yes |
| Green | 490-560 nm | Yes |
| Blue | 450-490 nm | Yes |
| Violet | 400-450 nm | Yes |
| Ultraviolet | below 400 nm | No |

Any color above red (635 to 700 nm) is referred to as Infra-Red and on the other end of the spectrum any color below violet (400 to 450 nm) is called ultraviolet. The ultraviolet spectrum is divided into several subcategories based on the wavelength:

400-450 nm Violet, (visible light, shown for reference only)

320-400 nm UVA, Long Wave, Black Light 280-320 nm UVB, Medium Wave 100-280 nm Short Wave, Germicidal Long wave ultraviolet (UVA), 320-400 nm, is used for true black lights and is relatively safe on the eyes. In contrast, Medium (280-320 nm) and Short wave ultraviolet light (100-280 nm) can cause harm and damage to the human eye. Therefore, the perfect operational and safe blacklight will have the shortest wavelength without going below the harmful 320 nm threshold and yet would have nominal visible light (above 400 nm). Another unique ability of long wave UV light is that it can penetrate some types of clothing/material and then illuminate whatever is beneath this top layer. This capability may allow a surface fabric material to cloak the underlying UV substrate so it appears as normal fabric to the human eye under normal illumination—yet allows it to glow brightly when exposed to UV light in the 320-450 nm range. These UV materials may be very easy to incorporate into or onto items the apparatus needs to interact with simply by coating, infusing, dyeing, staining, painting, etc. (i.e. seat restraint belts, escape hatches, egress pathways, etc.)—this will add the needed illumination capability required for covert or reduced visual signature operations.

One embodiment of illumination device 35 is sufficiently sturdy (e.g., waterproof, shock and vibration-proof) for field combat as well as commercial use and in order to not suffer breakage from dropping or rough handling situations. Illumination levels provided by illumination device 35 are dependent upon factors such as candela requirements, area and/or region of visibility desired by the user and hours of operation required. In addition, embodiments of illumination device 35 feed fiber optics if such attributes are required. Moreover, certain embodiments use electroluminescence (EL) for emergency location features, lighting, and/or identification purposes.

In addition, in one embodiment of lighted egress apparatus 1, the illumination device 35 is included as a low power (LP) indicator 35 that comprises any attention-getting indicator that notifies the user or maintainer when to exchange power supply 20 with a fresh power source. Accordingly, one embodiment herein sets the level at which the indicator activates at a threshold that still provides many hours of illumination. This ensures lighted egress apparatus 1 is fully operational and not subject to failure when needed. Embodiments of LP indicator (e.g., illumination device 35) include, but are not limited to a means to flash the existing illumination device, or operate a separate illumination device/signal indicator (e.g., a red LED). In addition, one embodiment of the LP indicator (e.g., illumination device 35) is placed in a position that is visible even when lighted egress apparatus 1 is placed in a stowage dock (as described below). Moreover, one embodiment of the LP indicator is embodied as an audio device 54 that employs an audible beeping device (as described below) to add an additional awareness stimuli. Such embodiments of the LP indicator (e.g., audio device 54) may be critical to the operational effectiveness of lighted egress apparatus 1, especially when such an apparatus 1 may be used very infrequently and yet must always be relied on in the event of an emergency. Without such warning devices, the infrequent use may lead to the potential of a tool that is not ready to be used when an emergency does occur unless the operator or maintainer remembers to periodically check lighted egress apparatus 1 to ensure full functionality.

Figure 7:
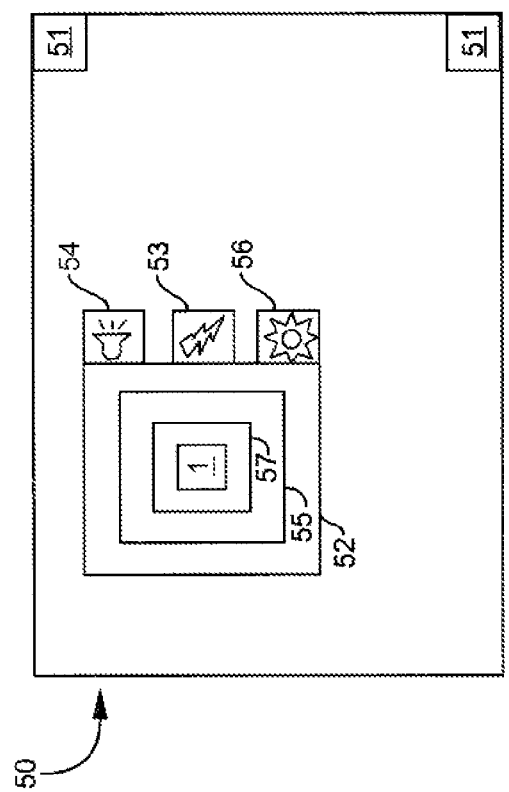
FIG. 7 illustrates a block diagram of an lighted egress apparatus coupled to a vehicular platform according to an embodiment herein.

FIG. 7, with reference to FIGS. 1 through 6, illustrates lighted egress apparatus 1 coupled to vehicular platform 50. According to FIG. 7, one embodiment herein includes a stowage device 52 that is coupled to vehicular platform 50 (e.g., using power coupling 53) and includes a stowage point or dock (not shown) for lighted egress apparatus 1. In one such embodiment, stowage device 52 contains lighted egress apparatus 1 secured against loss and violent movements yet allows release of lighted egress apparatus 1 very quickly with one hand under adverse conditions. As shown in FIG. 7, stowage device 52 has two separate release mechanisms. The first release mechanism is the long-term/travel restraint (e.g. long-term restraint 55) that holds lighted egress apparatus 1 securely under all conditions and will release lighted egress apparatus 1 only by activation of the release tab/handle (not shown). When this handle is depressed, or activated, lighted egress apparatus 1 is released from long-term restraint 55, but does not entirely release lighted egress apparatus 1. Thus, activation of the first release mechanism (e.g., long-term restraint 55) positions lighted egress apparatus 1 in a "ready" status. The "ready" status means that lighted egress apparatus 1 is still held by stowage device 52 but is easily grasped and released with one hand for use. The purpose of the second release mechanism (e.g., temporary restraint 57) is that the user may only have one hand available to access lighted egress apparatus 1, if lighted egress apparatus 1 pops out of stowage device 52 when the user hits the release mechanism the operating hand may not be able to secure lighted egress apparatus 1 when ejected; thus, after being ejected, lighted egress apparatus 1 is still held in place so the apparatus 1 does not fall and get lost and allows the user the convenience of now grasping lighted egress apparatus 1 on his/her own terms. Consequently, in one embodiment herein, the secondary release positions lighted egress apparatus 1 for easy retrieval via temporary restraint 57. Temporary restraint 57 includes, but is not limited to, a hook and loop restraint, a spring mechanism, or a magnetic release. In addition, embodiments herein of stowage device 52 further include, but are not limited to holster, pouch, rigid holder, magnetic mount, or anything that will fulfill the stowage requirements for use of lighted egress apparatus 1. In certain desirable embodiments, the temporary restraint, for example a holster, includes a magnet that is configured to turn off the illumination device 35 provided on the lighted egress apparatus 1 such that the illumination device 35 is turned on when the lighted egress apparatus 1 is removed from the temporary restraint, e.g. holster.

Additionally, in one embodiment herein, stowage device 52 incorporates the LP indicator, for example as described above; e.g., with the flashing light (e.g., using long-term restraint illumination device 56) and/or audible alarm (e.g., using audio device 54). In such an embodiment, stowage device 52 incorporates a warning indicator illumination device (e.g., long-term restraint illumination device 56 and/or audio device 54) in the release handle area. In one embodiment herein, the warning indicator illumination device (e.g., long-term restraint illumination device 56 and/or audio device 54) is activated when the vehicle (e.g., vehicle platform 50) is in a crash, roll over, or other emergency occurs and indicates to the user where to locate lighted egress apparatus 1 and exactly where to strike the release handle (not shown) to eject lighted egress apparatus 1 for emergency use and also provide illumination above the user for better SA. Any vehicle (e.g., vehicular platform 50) using the embodiments herein can use crash sensors and roll over indicators (e.g., sensors 51) to energize the indicators (e.g., long-term restraint illumination device 56 and/or audio device 54) of stowage device 52. In one embodiment herein, vehicles that do not have this organic feature have a crash/rollover sensor (e.g., sensors 51) integrated within stowage device 52.

Additionally, an embodiment herein includes a security switch device (e.g., long-term restraint illumination device 56 and/or audio device 54) incorporated into or onto the apparatus 1 to reduce and discourage the unauthorized use of lighted egress apparatus 1 away from the stowage point (e.g., stowage device 52) in the vehicle (vehicular platform 50). In one embodiment, the security switch device (e.g., long-term restraint illumination device 56 and/or audio device 54) is fitted with a mechanism (not shown) (e.g., magnetic switch) that, when removed from its sheath, holster, or mounting apparatus, would activate a light (e.g., long-term restraint illumination device 56 and/or illumination device 35, shown in FIGS. 6 and 7) in a flashing mode. In such an embodiment, security switch device (e.g., long-term restraint illumination device 56 and/or audio device 54) helps to reduce theft and pilferage since lighted egress apparatus 1 continues blinking until the power supply 20 (e.g., battery) is drained or lighted egress apparatus 1 has to be opened up and the circuitry 30 disabled to stop the flashing light. The constant blinking light helps negate the easy use as a flashlight and draw attention to lighted egress apparatus 1. In addition, one embodiment of the security switch device (e.g., long-term restraint illumination device 56 and/or audio device 54) includes a circuit (not shown) designed to render the light useless if modified, and thereby negating the lighted feature altogether.

In addition to lighted egress apparatus 1 blinking when removed from stowage device 52, in one embodiment herein, stowage device 52 has an independent lighted circuit (e.g., long-term restraint illumination device 56) which blinks when lighted egress apparatus 1 is removed, thereby alerting users to the missing lighted egress apparatus 1 and the need to replace lighted egress apparatus 1 (e.g., for mission safety compliance). In addition, in one embodiment herein, when lighted egress apparatus 1 is removed from stowage device 52, apparatus 1 begins to blink (e.g., long-term restraint illumination device 56). This blinking helps the user to locate lighted egress apparatus 1 if dropped during the escape procedure in dark or low light conditions. In such an embodiment, when the user presses the switch device (e.g., switch 25, shown in FIG. 5), the light (e.g., illumination device 35, shown in FIG. 6) remains on a constant beam without blinking so the light (e.g., illumination device 35, shown in FIG. 6) serves as an effective flashlight during the belt cutting procedures (as shown in FIGS. 2A through 2C). Furthermore, in such an embodiment, when the switch (e.g., switch 25, shown in FIG. 5) is released, lighted egress apparatus 1 remains blinking again until replaced back into the stowage device 52, where the apparatus 1 then shuts off. In addition, in one embodiment herein, lighted egress apparatus 1 experiences little to no drain on any power supply (e.g., power supply 20 shown in FIG. 3A) while coupled to stowage device 52 and instead draws power from power coupling 53 until lighted egress apparatus 1 is removed, thereby extending the life of the power supply 20. In a further embodiment herein, stowage device 52 benefits from an LP indicator (long-term restraint illumination device 56 and/or audio device 54) to notify users of the low power condition, since stowage device 52 is also used infrequently.

An additional embodiment herein includes an audible alarm (and/or a flashing light by using long-term restraint illumination device 56 and/or audio device 54) incorporated into stowage device 52. In one such embodiment, the audible alarm (e.g., using audio device 54) has its own power supply (e.g., is coupled to vehicular power using power coupling 53) and miniature speaker circuitry not associated with lighted egress apparatus 1. Once lighted egress apparatus 1 is removed, in such an embodiment, stowage device 52 indicators (e.g., long-term restraint illumination device 56 and/or audio device 54) begin to sound an alarm and could also activate a blinking light. Such an embodiment helps reduce pilferage of lighted egress apparatus 1 when not being used for emergency escapes by drawing attention to the apparatus 1 using visual and audible cues. In addition, one embodiment of the audible alarm (e.g., using audio device 54) is configured to not activate in a crash or roll over situation (e.g., as sensed by sensors 51), thus not accentuating an already chaotic condition if desired or for security/concealment reasons.

As described below, lighted egress apparatus 1 can be configured in many different ways, depending on what the user desires, mission dictates, or situation requirements demand. Some examples of different configurations are listed below; however such examples are not an inclusive list of all variations and adaptations of the embodiments herein.

In one example, lighted egress apparatus 1 is equipped with a manual on/off switch activation (e.g., switch 25) and does not have automatic switching. Illumination operation of lighted egress apparatus 1 is completely controlled by the user. This may be advantageous for emergency operations where use is conducted under hostile conditions and the user requires complete control over light discipline. For example, a downed pilot may need lighted egress apparatus 1 for extraction from the aircraft but does not want the light on after that. However, the pilot may want to take lighted egress apparatus 1 with him for other survival purposes. In this case the manual operation is desired.

In another illustrative example, lighted egress apparatus 1 is automatically turned on when removed from stowage device 52 and continues to illuminate until being returned to stowage device 52. There is no human activation needed to operate the illuminator switch (e.g., switch 25) on lighted egress apparatus 1 other than retrieving the apparatus 1 from the stowage device 52. This reduces the demand on the user to maintain pressure or grip on any switching mechanism, surface, or device. This embodiment may employ (for example) a reed type switch that is magnetically activated as the apparatus 1 is removed from the stowage device 52. When the apparatus is stowed in the stowage device 52 the reed switch is held open by a nearby magnet in close proximity to the reed switch such that when the apparatus is moved away from the stowage device 52 the magnetic field is broken and the reed switch then closes and completes the circuit allowing the illumination device 35 to illuminate. In this embodiment the reed switch would take the place of the manually operated switch. Another embodiment may use a pair of opposed spring loaded conductive contacts (i.e. metal strips) separated by a non-conductive insulator; when the insulator is removed the contacts come into contact with each other and the circuit is now closed and the illumination device 35 will operate. This non-conductive insulator strip could be positioned in the stowage device so that when the apparatus is reinserted or stowed the contacts would then again be broken and turn the illumination device off. Such an embodiment may reduce pilferage as well, since the apparatus 1 would be continuously on and not have an "off" feature available at the users demand. In addition, such an embodiment also draws attention as soon as the apparatus 1 is removed from the stowage point (e.g., stowage device 52).

Additionally, illumination device 35 could also assist in locating a dropped or missing lighted egress apparatus 1 in dark egress situations.

In an additional example, when lighted egress apparatus 1 is removed from its stowage device 52, illumination device 35 automatically begins to flash or blink. The blinking is overridden when the user activates the switch mechanism (e.g., switch 25) and then the light (e.g., illumination device 35) is in a continuous mode, once the pressure is released from the switch (e.g., switch 25), illumination device 35 begins to blink again. The blinking stops when (e.g., switch 25) the apparatus 1 is placed back into stowage device 52 or when the power supply (e.g., power supply 20) fails. This feature draws attention to lighted egress apparatus 1 and helps to locate apparatus 1 if dropped and still allows full continuous beam function by pressing the switch 25.

In yet a further example, the illumination light (e.g., as provided by illumination device 35) may not be the light that flashes or indicates low battery or non-authorized use. Instead, there may be a separate illumination device (e.g., long-term restraint illumination device 56) which warns of "low power" and permits the flash or blink feature. This may be necessary because the illumination light may be difficult to see or may be obscured when in stowage device 52. The warning light could be placed in a more visible area of lighted egress apparatus 1 away from the illumination portion and readily visible when in stowage device 52.

In addition to the features described above, one embodiment of lighted egress apparatus 1 is easily retrofitted into any existing vehicle, platform 50, or structure by using a wireless system instead of hard wiring. Such an embodiment includes a roll over/accident sensor (e.g., sensor 51) that, when activated, sends out a wireless signal to stowage device 52 of the lighted egress apparatus 1. Under such an embodiment, when the signal is received in stowage device 52, stowage device 52 is energized and begins to illuminate for easy location and or situational awareness. The user can then locate stowage device 52 and retrieve lighted egress apparatus 1 for the emergency escape efforts. The advantage of being a wireless system is that stowage device 52 and lighted egress apparatus 1 can be easily retrofitted into any existing vehicle or platform 50 that will benefit from such a life saving system and does not have to be hard wired into existing vehicles. However, the system could be hardwired if designed into the production of the platform, vehicle, or structure.

In addition, embodiments herein include a "roll over/crash" sensor (e.g., sensor 51) that sends out a distress signal with GPS coordinates so rescue crews are notified of the situation and can also locate the distressed vehicle. For example, such a situation may include the vehicle rolling into a water canal, which may be so deep that water covers or nearly covers the entire vehicle. If the accident occurs at night and the vehicle rolls down an embankment into a valley, gorge, or water hazard, then locating the vehicle may be difficult if not impossible. The Distress Warning Signal System (DWSS) could be applied to any current vehicle in use and would be an easy bolt-on retrofit. For example, modules or pods containing the signaling devices and equipment are attached to the vehicles exterior surfaces in one embodiment herein. In such an embodiment, the modules (sensor 51) are located on each side of the vehicle, so orientation after a crash or roll over would position one or more modules in an upright orientation. Moreover, in such an embodiment, the modules open or deploy the signaling systems when internal indicators detected other than normal positioning; i.e., a roll over. In addition, one embodiment herein includes modules that house a tethered helium balloon system, which inflate and rise above the vehicle and allow for better communication and all signal sending capabilities. In such an embodiment, the highly visible balloon—in addition to functioning as an antenna—also is an immediate locating anchor feature for rescue crews even if the vehicle is completely under water. In another embodiment herein, the modules employ an exterior warning beacon for visual, infrared, audible, smoke, flare, or a multitude of other indicators to alert rescue teams to the location of the vehicle. The incorporation of the DWSS helps rescue teams to quickly locate any vehicle in distress and accident situations.

As described above, embodiments herein provide lifesaving assistance to aircrew members, pilots, and others in need of such a device for their survival and safety concerns. In addition, a class of vehicles known as Mine Resistant Ambush Protected (MRAP) is designed to help protect the occupants from fatal injuries when exposed to improvised explosive device (IED) blasts. Lap and shoulder belt restraint systems are a part of the MRAP safety equipment employed to help provide this protection. When exposed to an IED blast, vehicle occupants are subjected to large-scale forces and rapid accelerations in which case they may experience violent and chaotic body contortions. During such an event, the vehicle can be thrown about and become disabled, losing all internal power and sustain severe damage to the exterior of the vehicle. However, even though the vehicle interior is designed to withstand and protect occupants against external blast forces, there is still a significant risk of injury that can occur inside the crew compartment. These injuries can potentially be caused by several sources, some of which include rapid accelerations and violent contact with rigid protuberances in the vehicle, loss of sustained contact with seating surfaces in-turn exposing the body to the reactive forces of stretching seat restraint belts, as well as from spall-like projectiles flying around inside the vehicle (packs, ammo cans, weapons, debris, etc.). Additionally, occupants may end up hanging upside down, sideways, disoriented, confused, injured or unconscious leading to chaos and confusion after the IED blast.

In an effort to help the vehicle crew escape in such conditions they can use the apparatus 1 provided by the embodiments herein to extract themselves from the restraint belts in the event the buckle is damaged, broken, jammed, the buckle may become wedged between body armor and abdomen, or otherwise inoperable. Also, simultaneous release of all the belts may cause additional injury to the occupant or to a person beneath them if the vehicle is not in a normal upright position. Complicating the situation further is the possibility that the vehicle may have lost all power during the IED attack and fire/smoke, debris, water, sand, or dust may degrade conditions inside the vehicle to very low visibility or even total darkness. These conditions prove to be a huge hindrance to quickly locating, identifying, and grasping the correct belt to sever with a conventional safety/rescue knife, when they are comingled with all of the other equipment borne by soldiers, etc.

Figure 9B:
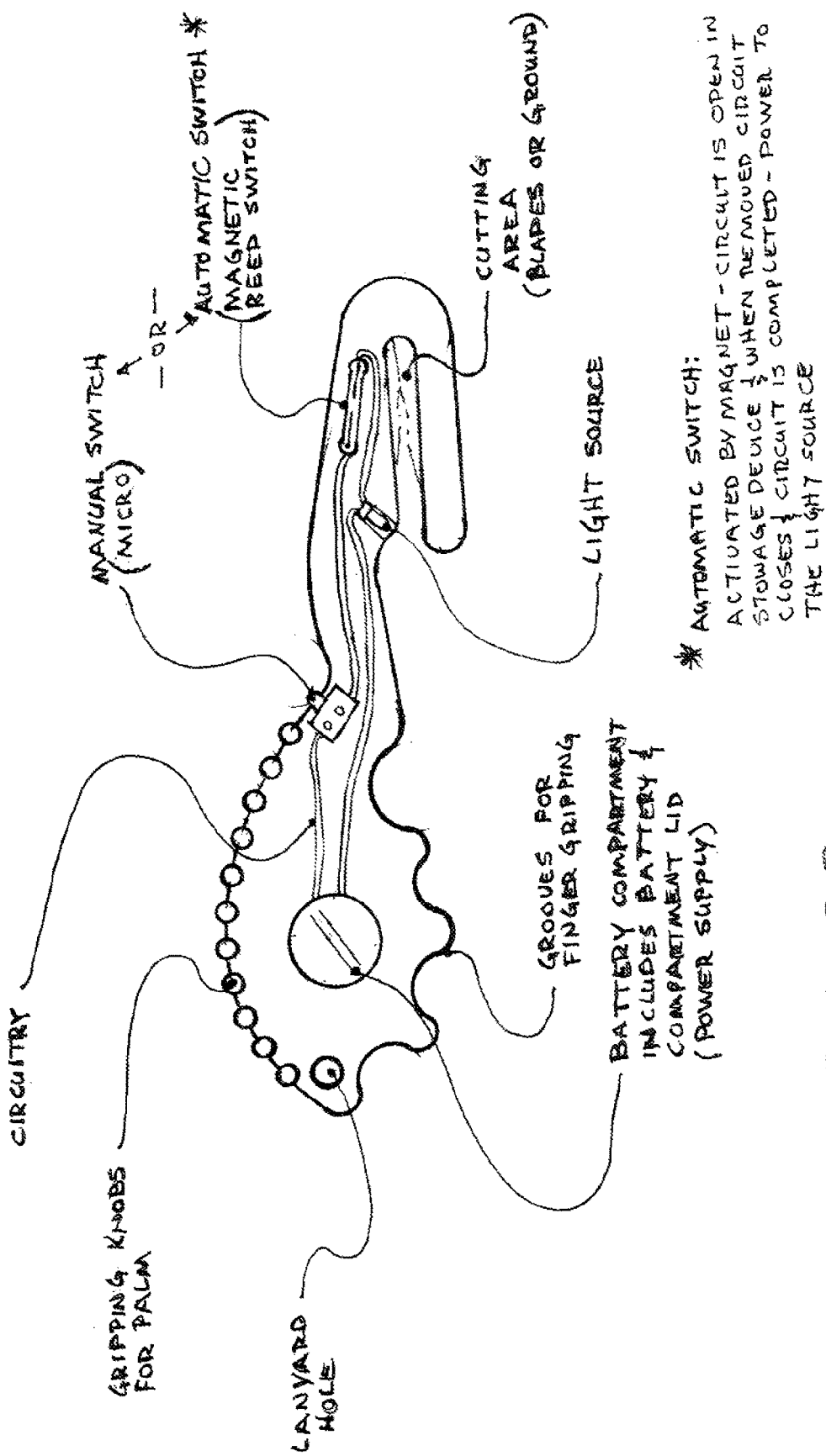
FIG. 9B illustrates a more detailed internal schematic diagram of the lighted egress apparatus illustrated in FIG. 9A.

FIG. 9 illustrates a schematic diagram of another lighted egress apparatus according to yet another embodiment. Lighted egress apparatus 1' includes a body 5' that houses a single cutting blade (not shown) or a pair of cutting blades (not shown) and a battery compartment for housing a power supply, for example a battery 20'. The lighted egress apparatus 1' illustrated in FIGS. 9A and 9B provides ergonomic, improved one handed gripping by including a form-fitting perimeter that includes optional finger recesses 42' for better grip purchase. Lighted egress apparatus 1' illustrated in FIGS. 9A and 9B also includes an optional palm swell feature 44' to fill the interior palm and/or hand of a user and provide a positive and secure purchase of the apparatus during emergency use. Palm swell feature 44' may further include optional gripping knobs 46' for further improving gripping. An optional hole 48' for a lanyard (not shown) may be provided in body 5'. FIG. 9B illustrates a detailed internal schematic diagram of the lighted egress apparatus illustrated in FIG. 9A. Body 5' can be made of two halves that mate and form one or more recessed for housing a light source, a power supply for the light source, circuitry to operate the light source and a manual switch or a automatic switch, for example a REED switch. In one preferred embodiment, the apparatus 1 or 1' includes a REED switch that is configured to turn on the light source when the apparatus is removed from a holster or other case that is designed and adapted to hold the lighted egress apparatus, on for example a person or a vehicle, when the apparatus is not in use.

FIG. 8, with reference to FIGS. 1 through 7, illustrates a flow diagram of emergency egression according to an embodiment herein. Step 60, in method of FIG. 8, describes providing a lighted egress apparatus (e.g., lighted egress apparatus 1). Step 65 describes locating a restraint (e.g., strap 40) using the lighted egress apparatus 1 (e.g., using illumination device 35). Step 70, in the method shown in FIG. 8, describes severing the restraint (e.g., strap 40) using the lighted egress apparatus 1 (e.g., using cutting blades 10).

FIG. 10 and cross-section FIG. 11 taken along line 3-3 in FIG. 10 illustrate a portion of a seat belt web 161 that is particularly adapted for use with the light feature of certain preferred light features of certain desirable embodiments of a lighted egress apparatus of the present invention. Seat belt web 161 includes a front surface 181 which faces forwardly of the soldier or other vehicle occupant, a rear side 120 which faces the soldier 12, and two side edges 22. The web itself is flat and flexible and may be constructed of any suitable material, such as woven fabric, a synthetic material, or the like. Still referring to FIGS. 10 and 11, in order to differentiate the web 161 for the restraint seat belts from other types of belts that may be present within a vehicle, a distinguishing feature 24 which is used only in connection with personnel restraint seat belts is provided adjacent at least one, and preferably both, of the web side edges 22.

FIG. 12 and cross-section FIG. 13 taken along line 5-5 in FIG. 12 illustrate a portion of another seat belt web 161 that is also particularly adapted for use with the light feature of certain preferred light features of certain desirable embodiments of a lighted egress apparatus of the present invention. FIG. 12 illustrates a modification to the seat belt 120 in which the distinguishing feature 24 comprises a plurality of spaced bumps 28 adjacent to one or both of the side edges 22 of the web 161. As shown in FIG. 13, these bumps 28 that protrude outwardly from the front surface 181 of the web 161 or the rear surface 120 of the web 161 (not shown), or both (also not shown).

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

The invention claimed is:

1. An apparatus comprising:
a unitary body comprising a cavity therewithin, said cavity defining a cutting opening and said unitary body further comprising a power supply configured to supply electricity and circuitry coupled to said power supply and configured to conduct said electricity;
a fixed blade partially received within said cavity and comprising a cutting edge, wherein said cutting edge is positioned at a fixed angle to the unitary body;
a switch partially received within said cavity and coupled to said circuitry, wherein activation of said switch completes said circuitry and allows said circuitry to conduct said electricity; and
an illumination device partially received within said cavity and coupled to said circuitry, wherein said illumination device illuminates as said circuitry conducts said electricity to said illumination device and positioned to direct illumination in front of said fixed blade such that said illumination is specifically directed toward the cutting opening so that the cutting opening and fixed blade can be directed by a user of the apparatus toward a belt or other strap that is to be cut and the user can readily see the cutting opening, the belt and where to cut the belt
wherein said illumination device illuminates in a wavelength other than normally visible to humans to illuminate a reflective surface or other indicator provided on a seat belt wherein said indicator reflects or emits visible light that humans can perceive.

2. The apparatus of claim 1, wherein said unitary body comprises at least one of a waterproof, shockproof, and vibration-proof housing.

3. The apparatus of claim 1, wherein said power supply comprises at least one of a battery and a capacitor.

4. The apparatus of claim 1, wherein said fixed blade comprises twin-cutting blades arranged in a "V" configuration.

5. The apparatus of claim 4,
wherein said unitary body comprises a housing comprising a top wall, a first side wall spaced from and parallel to a second side wall, a rear end wall, and a forward end wall,
wherein said cavity comprises a "V" shaped cavity defining an upper planar jaw wall and a lower planar jaw wall, the upper and lower planar jaw walls arranged orthogonally relative to the first and second side walls and defining an acute angle between the upper planar jaw wall and the lower planar jaw wall, and
wherein said twin-cutting blades are orthogonally and fixedly mounted to the upper and lower planar jaw walls.

6. The apparatus of claim 1, wherein said circuitry comprises at least one of wires, conductive ribbons, and printed circuits.

7. The apparatus of claim 1, wherein said switch comprises at least one of a mechanical switch, an electromechanical switch, and a magnetic switch.

8. The apparatus of claim 1, wherein said illumination device comprises at least one of a fiber optic light source, a light emitting diode (LED) capable of emitting various different wavelengths (visible, UV, IR, etc.), an incandescent light source, and an electroluminescent light source.

9. The apparatus of claim 8, wherein said illumination device delivers at least one of constant illumination and intermittent illumination.

10. The apparatus of claim 9, wherein said illumination device comprises a multi-color LED and said illumination device illuminates in a first color when delivering constant illumination and said illumination device illuminates in a second color when delivering intermittent illumination.

11. The apparatus of claim 1, wherein said long-term restraint comprises a long-term restraint illumination device and said long-term restraint illumination device receives power from at least one of an internal power supply and an external power supply.

12. The system of claim 11, further comprising a sensor sensing at least one of a crash and a rollover of a vehicle, wherein upon said sensor sensing at least one of a crash and a rollover, said long-term restraint illumination device illuminates said long-term restraint.

13. The system of claim 12, wherein each of said stowage device and said lighted egress apparatus comprise a power coupling, and wherein said lighted egress apparatus receives power from said stowage device through said power coupling.

14. The apparatus of claim 1, further comprising a sensor sensing at least one of a crash and a rollover of a vehicle, wherein upon said sensor sensing at least one of a crash and a rollover, said long-term restraint illumination device illuminates said long-term restraint.

15. A system comprising:
a lighted egress apparatus comprising:
a unitary body comprising a cavity therewithin, said cavity defining a cutting opening and said unitary body further comprising a power supply configured to supply electricity and circuitry coupled to said power supply and configured to conduct said electricity;
a fixed blade partially received within said cavity and comprising a cutting edge, wherein said cutting blade is positioned at a fixed angle to the unitary body;
a switch partially received within said cavity and coupled to said circuitry, wherein activation of said switch completes said circuitry and allows said circuitry to conduct said electricity; and
an illumination device partially received within said cavity and coupled to said circuitry, wherein said illumination device illuminates as said circuitry conducts said electricity to said illumination device and positioned to direct illumination in front of the cutting opening; and
a stowage device configured to securely stow said lighted egress apparatus
wherein said illumination device illuminates in a wavelength other than normally visible to humans to illuminate a reflective surface or other indicator provided on a seat belt wherein said indicator reflects or emits visible light that humans can perceive.

16. The system of claim 15, wherein said stowage device comprises a long-term restraint and a temporary restraint, wherein said temporary restraint is accessible only after said long-term restraint has been released.

17. The system of claim 15,
wherein said stowage device comprises an audio device, wherein said power coupling detects a power level of said power supply of said lighted egress apparatus, and wherein said audio device emits an audio signal when said power level of said power supply is detected below a safety power threshold.

18. The system of claim 15, further comprising a long-term restraint illumination device that illuminates said long-term restraint when said power level of said power supply is detected below a safety power threshold.

19. A cutting apparatus designed and adapted to be used for locating and cutting a seat belt with indicators including the cutting apparatus and a seat belt with indicators, the cutting apparatus comprising:
 a cutting apparatus that comprises a unitary body that comprises:
  a first cavity therewithin, said first cavity comprising a power supply configured to supply electricity and circuitry coupled to said power supply and configured to transport said electricity;
  a main body;
  a lower jaw fixedly coupled to said main body; and
  a second cavity formed from said main body and said lower jaw;
 a twin-cutting blades fixed within said second cavity and comprising a first cutting blade partially received within said first cavity and a second cutting blade fixed to said lower jaw, wherein said twin-cutting blade is positioned at a fixed angle to the unitary body;
 a switch partially received within said first cavity and coupled to said circuitry, wherein activation of said switch completes said circuitry and allows said circuitry to convey said electricity; and
 an illumination device partially received within said first cavity and coupled to said circuitry, wherein said illumination device illuminates as said circuitry conveys said electricity to said illumination device and positioned to direct light in a wavelength other than normally visible to humans in front of said second cavity to illuminate a reflective surface or other indicator that is provided on the seat belt
 and a seat belt with indicators that comprises indicators that reflect or emit light visible light that humans can perceive from light in a wavelength other than normally visible to humans that is provided by said illumination device provided on said cutting device.

20. The cutting apparatus of claim 19, wherein said twin-cutting blades are arranged in a "V" configuration.

21. The cutting apparatus of claim 19, further comprising a sensor sensing at least one of a crash and a rollover of a vehicle, wherein upon said sensor sensing at least one of a crash and a rollover, said long-term restraint illumination device illuminates said long-term restraint.

* * * * *